J. LANGLEY.
MACHINE FOR CARROTING OR OTHERWISE PREPARING FUR FOR FELTING.
APPLICATION FILED AUG. 16, 1907.

903,992.

Patented Nov. 17, 1908.

2 SHEETS—SHEET 1.

Witnesses
Alfred Bosshardt
Stanley E Bramall

Inventor
John Langley
Per F. Bosshardt
Attorney

J. LANGLEY.
MACHINE FOR CARROTING OR OTHERWISE PREPARING FUR FOR FELTING.
APPLICATION FILED AUG. 16, 1907.

903,992.

Patented Nov. 17, 1908.
2 SHEETS—SHEET 2.

Witnesses:
Alfred Bosshardt
Stanley E. Bramall

Inventor.
John Langley.
Per J. Ffhardt
Attorney.

THE NORRIS PETERS CO., WASHINGTON, D. C.

UNITED STATES PATENT OFFICE.

JOHN LANGLEY, OF STOCKPORT, ENGLAND.

MACHINE FOR CARROTING OR OTHERWISE PREPARING FUR FOR FELTING.

No. 903,992.　　　Specification of Letters Patent.　　　Patented Nov. 17, 1908.

Application filed August 16, 1907. Serial No. 388,918.

*To all whom it may concern:*

Be it known that I, JOHN LANGLEY, a subject of Great Britain, residing at Stockport, in the county of Chester, England, have invented new and useful Improvements in Machines for Carroting or Otherwise Preparing Fur for Felting, of which the following is a specification.

My invention relates to improvements in machines for carroting or otherwise preparing fur for felting. In the machines hitherto known for such purposes, the carroting or other fur preparing solution has been applied to the fur on the skin by a brush, revolving or fixed in a tank containing the said solution, or from a tank by a conduit and atomized by a jet of air. This manner of applying the solution has been found very wasteful and also very destructive for the brush the latter lasting only a very short time and it has also been found that the solution did not penetrate the fur to the skin which is essential for good work.

My invention has for its object to overcome the said defects.

I attain these objects by the means illustrated in the accompanying drawings, in which—

Figure 1:
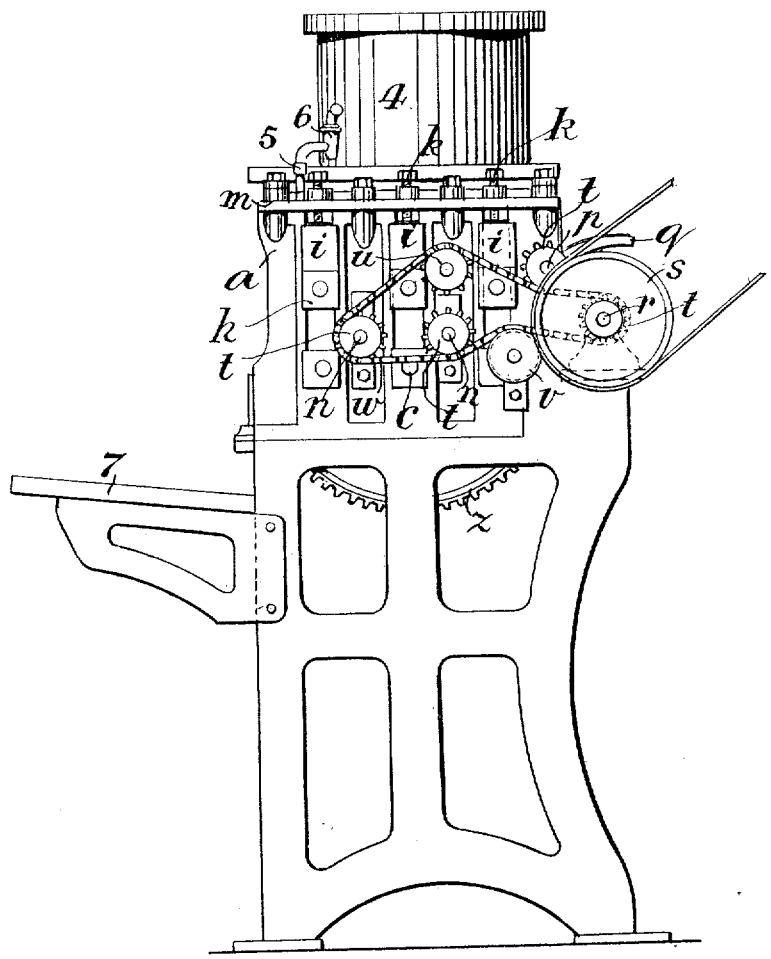
Figure 2:
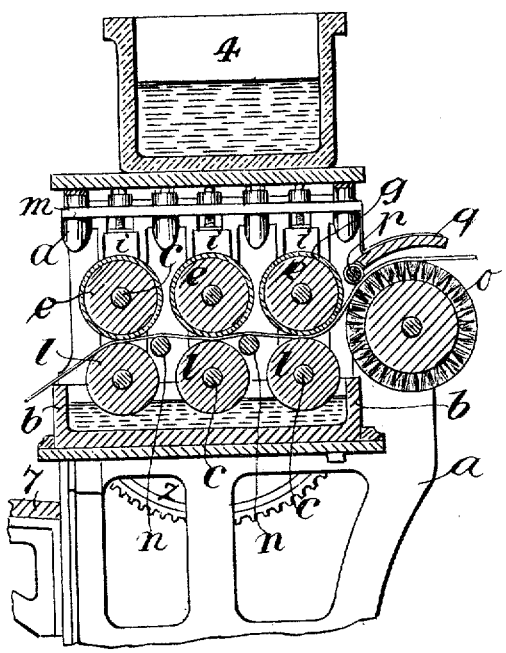
Figure 4:
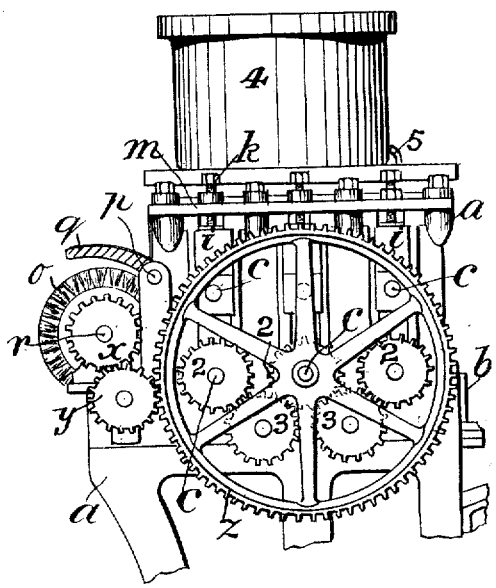
Figure 3:
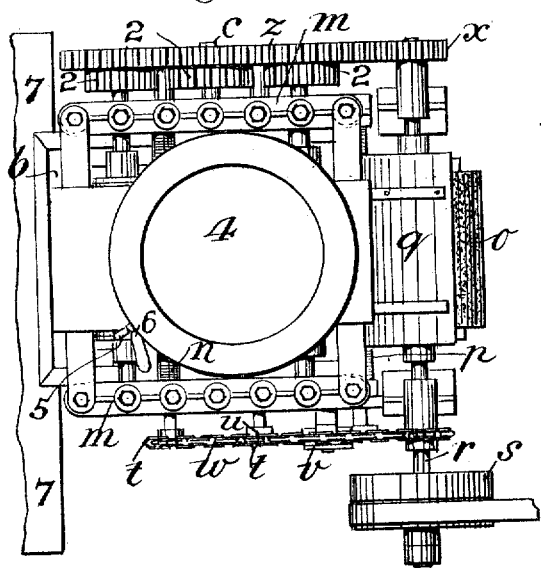
Figure 5:
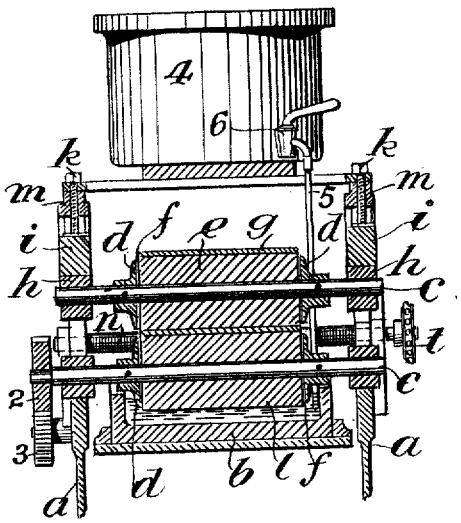

Figures 1 and 4 are side views, Fig. 2 a longitudinal section, Fig. 3 a plan, and Fig. 5 a cross section of a felt carroting or preparing machine constructed in accordance with my invention.

Similar letters refer to similar parts throughout the several views.

In carrying out my invention and referring to the figures generally, I employ within a suitable frame $a$, a solution tank $b$ and above it a suitable number of pairs of rollers $e, l$, say three pairs. These rollers are made of acid resisting material, preferably earthenware, which are ground to run perfectly true and secured upon their shafts $c$ between acid resisting brass disks $d$ pinned thereto, see more particularly Fig. 5. Between the said roller ends and metal disks rubber disks $f$ are inserted to provide grip.

The upper rollers $e$ are covered with india rubber $g$ and mounted in bearings $h$ placed under the influence of india rubber blocks $i$ rendered vertically adjustable, say by means of set screws $k$ carried by a bar $m$ secured to the top of the frame $a$. The bottom rollers are not adjustable and dip into the solution in the tank $b$. Between each two pairs of rollers $e, l$, I employ a carrier and tension roller $n$ made of acid resisting brass and mounted in vertically adjustable bearings on the frame while at the delivery end of the machine I employ in suitable bearings close to the top roller $e$ a rotary brush $o$, a guide and tension roller $p$ and a cover $q$ extending from the latter a suitable distance over the said brush. The rollers $n$ and $p$ are made of acid resisting brass and are circularly grooved.

To one end of the brush shaft $r$ is secured a pulley $s$ which has rotary motion imparted by a belt $s'$. To the same end and behind the said pulley and to each of the respective ends of the small rollers $n, p$ is secured a sprocket wheel $t$, see Fig. 1, over which and two carrier wheels or pulleys $u, v$ passes a chain $w$ which imparts motion to the said rollers, the latter pulley being rendered adjustable to give the chain $w$ the required tension. Upon the other end of the said brush shaft, see Fig. 4, is secured a spur wheel $x$ by means of a carrier wheel $y$ geared up with a large wheel $z$ secured upon the shaft $c$ of the bottom middle roller $l$. Upon the latter and each of the other bottom roller shafts $c$ is secured a spur wheel 2 which are geared up by the carrier wheels 3. The said large rollers are geared up to have a uniform surface speed while the small rollers $n, p$ run at a slightly increased speed and the brush $o$ about five and a half revolutions to one of the rollers $e, l$. Upon the top of the frame of the machine is employed a solution supply vessel 4 preferably made of earthenware having a pipe 5 furnished with a tap 6 and reaching to the tank $b$ whereby the latter is fed with solution.

The operation of the machine is as follows:—The skin to be treated is fed into the machine from the table 7 fur downwards, passing between the large and over the smaller rollers $e, l$ and $n$ respectively, the latter being adapted to carry the skin from one pair of rollers to the other and being grooved extend it. The bottom rollers $l$ revolving pick up from the tank $b$ and saturate the fur with solution and as the skin passes between the nip of each pair of rollers, the solution is caused to penetrate the fur right down to the skin and is pressed out again by the top rollers $e$, the pressed out solution running back into its tank $b$. When the skin leaves the last pair of rollers it passes between the brush $o$ and the grooved roller $p$ which latter keeps the skin extended and supports it while the brush operates on the fur, that is to say, straightens it ready for stoving or drying. By raising or lowering the rollers *n* the tension on the skin can be regulated to a nicety.

I claim:

1. In a machine for preparing fur for felting, a frame, a fur saturating roller and a pressure roller mounted one above the other in pairs in the said frame in a horizontal plane, between which rollers the skin is fed, a grooved roller intermediate between the said saturating rollers to carry the skin from one pair of rollers to the other and at the same time keep it extended and a tank containing solution into which the said saturating rollers dip, all combined substantially as and for the purpose set forth.

2. In a machine for preparing fur for felting, a frame, a fur saturating roller and a pressure roller mounted one above the other in pairs in the said frame in a horizontal plane, between which rollers the skin is fed, a grooved roller intermediate between the said saturating rollers to carry the skin from one pair of rollers to the other and at the same time keep it extended, a rotary brush and a grooved roller mounted in the said frame in close proximity to the last of the said pairs of rollers to receive and deliver the skin, the said roller being situated above and the skin passing over the said brush, all combined substantially as and for the purpose set forth.

3. In a machine for preparing fur for felting, a frame, a ground earthenware fur saturating roller and a ground earthenware pressure roller mounted one above the other in pairs in the said frame in a horizontal plane, a cover on each and means for subjecting the said pressure rollers to elastic pressure, the skin being fed between the said pairs of rollers fur down, all combined substantially as and for the purpose set forth.

4. In a machine for preparing fur for felting, a frame, a fur saturating roller and a pressure roller mounted one above the other in pairs in the said frame in a horizontal plane, between which rollers the skin is fed, a grooved roller intermediate between the said saturating rollers to carry the skin from one pair of rollers to the other and at the same time keep it extended, a tank containing solution into which the said saturating rollers dip, a solution supply vessel above the said pair of rollers, a pipe reaching from the latter into the said solution tank and means for regulating the flow of solution from the said vessel of the said tanks, all combined substantially as and for the purpose set forth.

In witness thereof I have hereunto set my hand in the presence of two witnesses.

JOHN LANGLEY.

Witnesses:
STANLEY E. BRAENALL,
FERDINAND B. BOSSHARDT.